United States Patent
Ginjpalli et al.

(10) Patent No.: US 7,120,151 B1
(45) Date of Patent: Oct. 10, 2006

(54) METHOD FOR FAST LABEL SWITCHOVER WITH MULTIPROTOCOL LABEL SWITCHING

(75) Inventors: Hariprasada R. Ginjpalli, Cupertino, CA (US); Durai Chinnaiah, San Jose, CA (US); Jayakumar Jayakumar, Bangalore, IN (US)

(73) Assignee: Cisco Technology, Inc., San Jose, CA (US)

( * ) Notice: Subject to any disclaimer, the term of this patent is extended or adjusted under 35 U.S.C. 154(b) by 924 days.

(21) Appl. No.: 09/967,174

(22) Filed: Sep. 27, 2001

(51) Int. Cl.
*H04L 12/56* (2006.01)

(52) U.S. Cl. .................... 370/395.1; 370/217

(58) Field of Classification Search ........ 307/229–237, 307/395.1, 401, 395.5, 395.51, 395.52, 395.53, 307/218, 238.1, 397–399, 902, 905, 409, 307/393
See application file for complete search history.

(56) References Cited

U.S. PATENT DOCUMENTS

| | | | |
|---|---|---|---|
| 6,721,269 B1 * | 4/2004 | Cao et al. ................ | 370/227 |
| 2001/0033574 A1 * | 10/2001 | Enoki et al. ............ | 370/396 |
| 2002/0163935 A1 * | 11/2002 | Paatela et al. .......... | 370/466 |
| 2002/0167898 A1 * | 11/2002 | Thang et al. ........... | 370/216 |
| 2004/0202171 A1 * | 10/2004 | Hama ..................... | 370/395.1 |

OTHER PUBLICATIONS

Chuck Semeria, "Multiprotocol Label Switching: Enhancing Routing in the New Public Network," www.juniper.net, Jul. 27, 2001, Juniper Networks, Inc.
E. Rosen, et al., "Multiprotocol Label Switching Architecture," Internet Engineering Task Force, Jan. 2001, The Internet Society.
Luca Martini, et al., "Transport of Layer 2 Frames Over MPLS," Internet Engineering Task Force, Jul. 2001.
Luca Martini, et al., "Encapsulation Methods for Transport of Layer 2 Frames Over IP and MPLS Networks," Internet Engineering Task Force, Jul. 2001.
L. Andersson, et al., "LDP Specification," Internet Engineering Task Force, Jan. 2001, The Internet Society.
Goran Hagard and Mikael Wolf, "Multiprotocol Label Switching in ATM Networks," The Telecommunications Technology Journal—No. 1, 1998.
Luca Martini, et al., "Transport of Layer 2 Frames Over MPLS draft-martini-12circuit-trans-mpls-07.txt," www.community.roxen.com, Jul. 2001.
"Layer 3 Switching Using MPSL," 1999-2000, NetPlane Systems, Inc., Dedham, MA, USA.

* cited by examiner

*Primary Examiner*—Hassan Kizou
*Assistant Examiner*—Salman Ahmed
(74) *Attorney, Agent, or Firm*—Blakely, Sokoloff, Taylor & Zafman LLP

(57) ABSTRACT

Two or more virtual circuit (VC) labels associated with a tunnel label are mapped to a group identification (GID). The tunnel label is mapped to the GID in a GID table. When the two or more VC labels are to be associated with a new tunnel label, the tunnel label in the GID table is changed to the new tunnel label.

28 Claims, 5 Drawing Sheets

| ATM id | VC Label | Tunnel Label | Interface |
|--------|----------|--------------|-----------|
| 10/100 | 100 | 20 -> 40 | 1 -> 3 |
| 20/200 | 200 | 20 -> 40 | 1 -> 3 |
| 30/300 | 300 | 30 | 2 |
| 40/400 | 400 | 20 -> 40 | 1 -> 3 |
FIG. 3 (Prior Art)
| ATM id | VC Label | Group id |
|--------|----------|----------|
| 10/100 | 100 | 1 |
| 20/200 | 200 | 1 |
| 30/300 | 300 | 2 |
| 40/400 | 400 | 1 |
FIG. 4
| Group id | Tunnel Label | Interface |
|----------|--------------|-----------|
| 1 | 20 -> 40 | 1 -> 3 |
| 2 | 30 | 3 |
| 3 | 40 | 2 |
| 4 | 50 | 5 |
FIG. 5
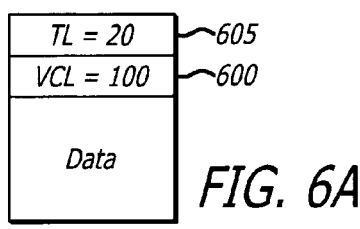
FIG. 6A
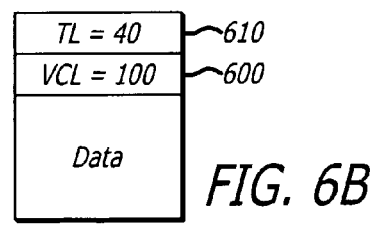
FIG. 6B
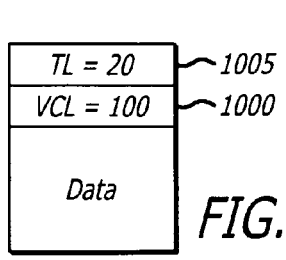
FIG. 10A
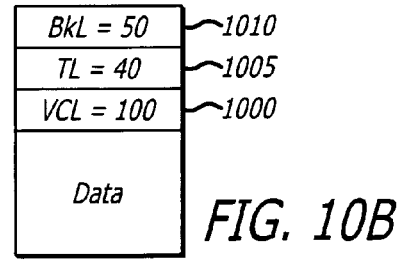
FIG. 10B

| Group id | Tunnel Label | Original Interface | Backup Label Enable | Backup Label | New Interface |
|---|---|---|---|---|---|
| 1 | 20 -> 40 | 1 -> 3 | NO | 1 | 2 |
| 2 | 30 | 3 | NO | 1 | 3 |
| 3 | 40 | 2 | NO | 2 | 4 |
| 4 | 50 | 5 | NO | 1 | 4 |

FIG. 8

| Group id | Tunnel Label | Original Interface | Backup Label Enable | Backup Label | New Interface |
|---|---|---|---|---|---|
| 1 | 20 | 1 | YES | 50 | 2 |
| 2 | 30 | 3 | NO | 60 | 3 |
| 3 | 40 | 2 | NO | 70 | 4 |
| 4 | 50 | 5 | NO | 80 | 4 |

FIG. 9

METHOD FOR FAST LABEL SWITCHOVER WITH MULTIPROTOCOL LABEL SWITCHING

FIELD OF THE INVENTION

The present invention relates generally to the field of network communication. More specifically, the present invention relates to a method and a system for providing fast label switchover for layer 2 transport over Multiprotocol Label Switching (MPLS).

BACKGROUND

Multiprotocol Label Switching (MPLS) is a technology for backbone networks. FIG. 1 is a diagram illustrating an example of a prior art MPLS network with edge routers and switch routers R0 to R6. Label Edge Routers (LERs) 100, 125 sit at edges of the MPLS network. The LER 100 is capable of encapsulating an MPLS label 103 to the datagram 102. In addition to the LERs 100 and 125, there may be multiple Label Switch Routers (LSRs) 105–120 responsible for forwarding the datagram 102. The LSR 105 also encapsulates the datagram 102 with another label 104. The LSRs 105–120 communicate with each other using a Label Distribution Protocol (LDP). The LER 100 is referred to as ingress LER, and the LER 125 is referred to as egress LER.

The datagram 102 travels from the LSR 105 to the LSR 120 through the MPLS network using a Label Switched Path (LSP) 135. The LSR 105 forwards the datagram 102 to its adjacent LSR 110. The LSR 110 then forwards the datagram 102 to its adjacent LSR 115, and so on. MPLS uses a hierarchy of labels known as label stack. For layer 2 transport over MPLS applications, the label stack includes a virtual circuit (VC) label and one or more tunnel labels above the VC label.

Referring to FIG. 1, the LER 100 pushes the first label 103 onto the label stack. This is the VC label. The VC label is determined based on information associated with the datagram 102. Thus, the VC label identifies a virtual circuit in the egress LER 125 that the ingress LER 100 wants the datagram 102 is to be forwarded to. Each VC label is associated with a VC.

The LSR 105 pushes the second label 104 on the label stack. This is the tunnel label. The tunnel label identifies the adjacent LSR 110 that the datagram 102 is to be forwarded to. This continues until the datagram 102 is forwarded to the LSR 120. The LSR 120 removes the current tunnel label from the top of the label stack but does not replace that tunnel label with another tunnel label because the operation associated with the tunnel label is a pop operation. Through the tunnel label, the LSR 120 also recognizes its adjacent router, which is the LER 125. When the LER 100 is adjacent to the LER 125, the VC label 103 is the only label pushed onto the label stack. Thus, the VC label is normally on the label stack, and the tunnel label, if present, is immediately above the VC label.

When a failure prevents the datagram 102 from being forwarded to the egress LER 125 along the LSP 135, the tunnel labels in the label stack may need to be modified. It is essential that this process be carried out quickly to minimize delay.

SUMMARY OF THE INVENTION

A method of rewriting tunnel labels in a multiprotocol label-switching (MPLS) network is disclosed. For one embodiment, one or more virtual circuit (VC) labels associated with a tunnel label are mapped to a group identification (GID). The tunnel label is mapped to the GID in a GID table. When the one or more VC labels are to be associated with a new tunnel label, the tunnel label in the GID table is changed to the new tunnel label.

Other features and advantages of the present invention will be apparent from the accompanying drawings and from the detailed description which follows.

BRIEF DESCRIPTION OF THE DRAWINGS

The present invention is illustrated by way of example, and not limitation, in the figures of the accompanying drawings in which like references indicate similar elements and in which:

FIG. 3 illustrates a prior art label table used in transporting asynchronous transfer mode (ATM) traffic over MPLS.

FIG. 4 is a label table that illustrates one embodiment of mapping VC labels to group identifications (GIDs).

FIG. 5 is a GID table that illustrates one embodiment of mapping GIDs to tunnel labels.

FIG. 6A is a diagram illustrating a datagram with a VC label and an existing tunnel label.

FIG. 6B is a diagram illustrating the same datagram as in FIG. 6A with a new tunnel label replacing the existing tunnel label.

FIG. 8 illustrates another embodiment of the GID table.

FIG. 9 illustrates enabling of backup labels using the GID table.

FIG. 10A illustrates a datagram with a VC label and an existing tunnel label.

FIG. 10B illustrates the same datagram as in FIG. 10A with an addition of a backup tunnel label

DETAILED DESCRIPTION

For one embodiment, a method and a system for rewriting tunnel labels in a multiprotocol label switching (MPLS) network is disclosed. Each of one or more tunnel labels supported by an MPLS router is mapped to a different group identification (GID) in a GID table. In a label table, each of one or more virtual circuit (VC) labels supported by the MPLS router is mapped to a GID corresponding to the tunnel label that the VC label is associated with. When one or more different tunnel labels are to be rewritten, the one or more different tunnel labels are rewritten in the GID table.

Figure 1:
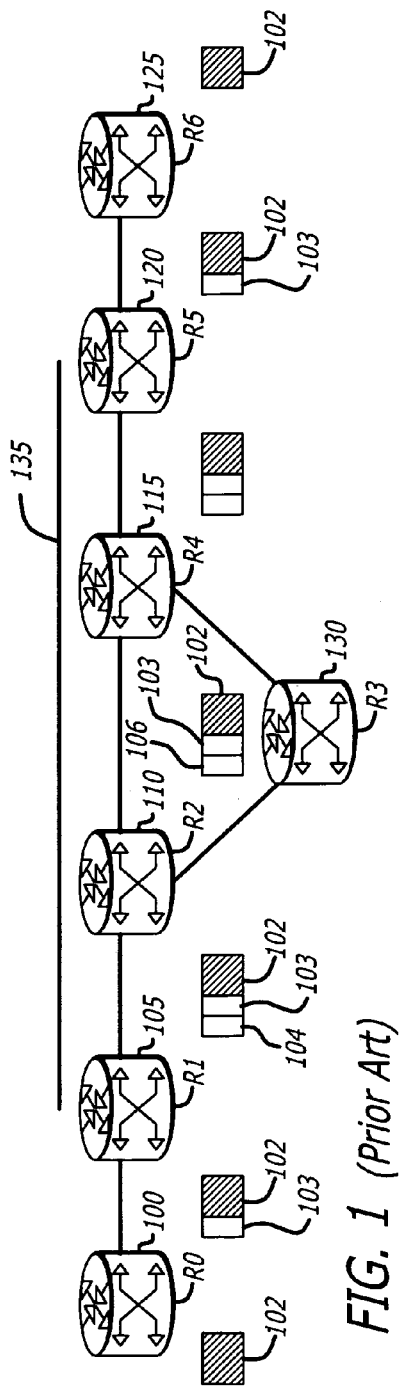
FIG. 1 is a diagram illustrating an example of a prior art MPLS network with edge routers and switch routers.
Figure 2A:
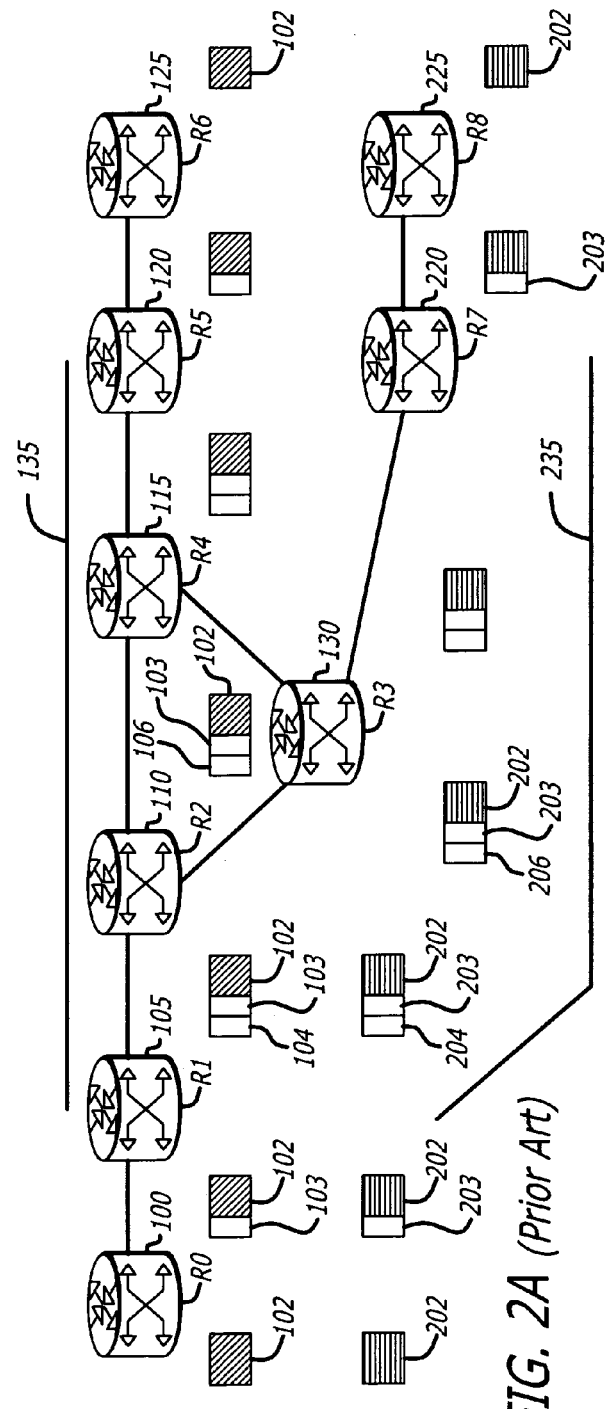
FIG. 2A is a diagram illustrating an example of a prior art MPLS network with multiple Label switch paths (LSPs) and multiple virtual circuits (VC).

FIG. 2A is a diagram illustrating an example of a prior art MPLS network with multiple Label switch paths (LSPs) and multiple virtual circuits (VC). Datagram 202 is to be forwarded from the ingress LER 100 to an egress LER 225 using LSP 235. A VC label 203 is pushed on top of the label stack associated with the datagram 202. The VC label 203 indicates that the datagram 202 is to be forwarded to the egress LER 225. The LSR 105 pushes a tunnel label 204 above the VC label 203 to indicate that the datagram 202 is to be forwarded to the LSR 110.

The tunnel labels 104 and 204 are not be the same because the LSPs 135 and 235 are different. Furthermore, because the LSR 110 forwards the datagram 102 to the LSR 115 and forwards the datagram 202 to the LSR 130, the tunnel label 106 is different from the tunnel label 206. Each LSR stores the VC label information and the tunnel label information in a database referred to as a label information base (LIB). For example, the LIB in the LSR 110 includes information that maps the tunnel label 104 to the tunnel label 106 and information that maps the tunnel label 204 to the tunnel label 206. The LSRs are not even aware that a VC label exists below a tunnel label. From the standpoint of the LSR 110, the tunnel labels 104 and 204 are incoming tunnel labels, and the tunnel labels 106 and 206 are outgoing tunnel labels.

The link between two adjacent LSRs is also referred to as a tunnel LSP. A single tunnel LSP is capable of carrying thousands of different VCs. As the transport of layer 2 data over MPLS becomes more popular, the number of VCs that get mapped to a single tunnel LSP increases. When a failure occurs (e.g., link failure, node failure, etc.) and an alternate tunnel LSP has to be used, the LIB has to be updated. For example, when the link between the LSR 105 and the LSR 110 fails, the LIB of the LSR 105 has to be updated. Typically, this involves rewriting the tunnel labels for all of the VCs that are previously mapped to the outgoing tunnel labels 104 and 204.

Figure 2B:
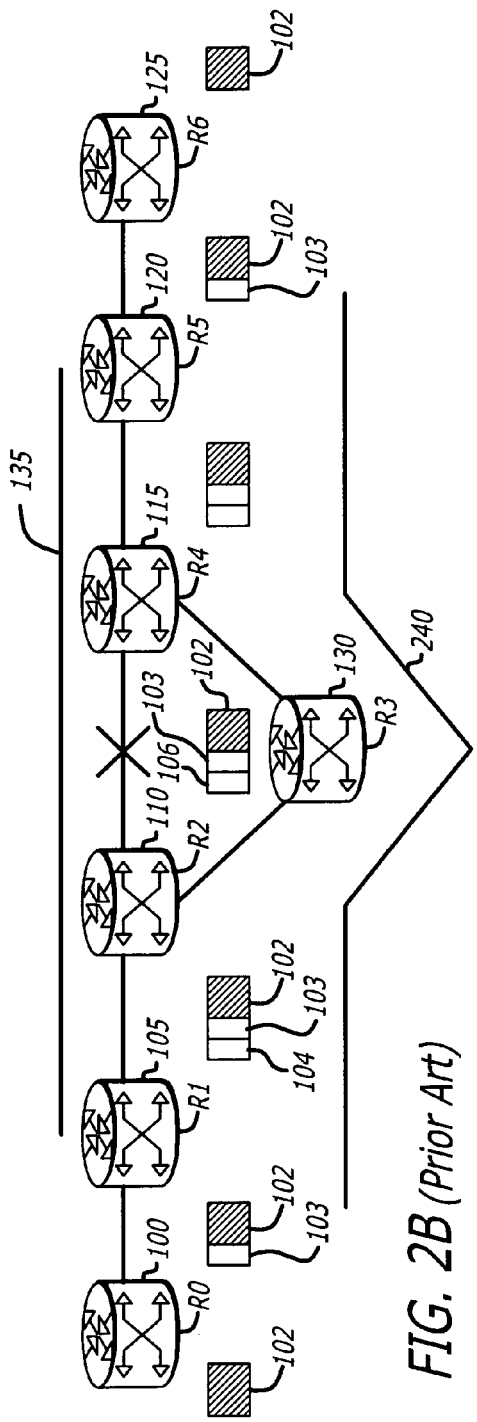
FIG. 2B is a diagram illustrating an example of a backup LSP in an MPLS network.

An LSP (or path) is controlled by a head-end router. For example, the LSP 135 is controlled by the head-end LSR 105. The head-end LSR 105 monitors the status of the LSP 135 by receiving information from other LSRs 110, 115, and 120 along the LSP 135. When there is an error along the path, the head-end router receives error information from the appropriate router. For example, when the link between the LSR 110 and the LSR 115 is broken, the LSR 105 receives error information from the LSR 110 and concludes that the LSP 135 has failed. The head-end LSR 105 then determines a backup LSP. FIG. 2B is a diagram illustrating an example of a backup LSP in an MPLS network. The backup LSP 240 is used to forward datagrams from the head-end LSR 105 when the primary LSP 135 fails due to a broken link between the LSR 110 and the LSR 115. The backup LSP 240 may be previously pre-configured or dynamically computed by the head-end router 105. The process of switching from the original LSP 135 to the backup LSP 240 is referred to as a path protection process and may require rewriting multiple tunnel labels.

FIG. 3 illustrates a prior art label table used in transporting asynchronous transfer mode (ATM) traffic over MPLS. The label table may be part of the LIB database stored in a LSR. The label table includes an ATM identification column 305, a VC label column 310, a tunnel label column 315, and an interface column 320. The ATM identification column 305 lists each virtual circuit (VC) identified by its VPI/VCI. VPI is a virtual path identifier that identifies a path that an ATM datagram (or cell) will take. VCI is a virtual channel identifier that identifies a channel within the path that the ATM datagram will take to reach its destination. There are four entries in this label table to identify four different VCs and VC labels supported by the LSR. Each of the four VC labels is associated with a tunnel label listed under the tunnel label column 315. Thus, when the LSR receives an ATM datagram with a VC label having a value of "100", the LSR adds an outgoing tunnel label having a value of "20" to that ATM datagram. The ATM datagram is then sent out to the interface "1" of the LSR. In this example, adding the outgoing tunnel label having the value of "20" is similar to pushing that tunnel label on top of the label stack, as previously described.

The label table in FIG. 3 indicates that there are three VC labels that are mapped to the outgoing tunnel label having the value of "20". These three VC labels have the value of "100", "200", and "400" respectively. The VC label having the value of "300" is mapped to an outgoing tunnel label having a value of "30". The label table lists an outgoing tunnel label for every VC label, even though the same outgoing tunnel label may be repeated multiple times.

When the LSR supports a large number of VCs, the label table in FIG. 3 can be very large. Typically in the prior art, when a path failure occurs that necessitate changing or rewriting an existing outgoing tunnel label to a new outgoing tunnel label, each corresponding entry in the label table has to be changed. For example, using the label table in FIG. 3, when the existing outgoing tunnel label having the value of "20" is to be changed to a new outgoing tunnel label having a value of "40", three entries have to be changed. When there are thousands of VC labels mapped to the same existing outgoing tunnel label, thousands of outgoing tunnel labels in the label table have to be changed. In addition to changing the outgoing tunnel labels, the corresponding interfaces may also need to be changed. For example, the interface column 320 indicates that an interface is changed from "1" to "3" to correspond to the new outgoing tunnel label having the value of "40".

FIG. 4 is a label table that illustrates one embodiment of mapping of the VC label to group identifications (GIDs). The label table in FIG. 4 includes an ATM identification column 405, a VC label column 410 and a GID column 415. For one embodiment of the present invention, each VC label that was previously mapped to the same tunnel label is mapped to one group identification. For example, the label table in FIG. 4 indicates that the VC labels having the values "100", "200", and "400" are mapped to the GID having a value of "1". Note that these same VC labels are mapped to the same tunnel label having the value of "20" in the label table in FIG. 3. Because the VC label having the value of "300" is mapped to a different tunnel label, it is mapped to a different GID (having a value of "2").

FIG. 5 is a GID table that illustrates one embodiment of mapping GIDs to tunnel labels. The GID table illustrates mapping of the GID to the tunnel label. The GID table includes a GID column 520, a tunnel label column 525, and an interface column 530. Each GID listed in the GID column 520 is mapped to a different tunnel label listed in the tunnel label column 525. For example, the GID having a value of "1" is mapped to the tunnel label having the value of "20". The GID having a value of "2" is mapped to the tunnel label having the value of "30", etc. The GID table and FIG. 5 and the label table in FIG. 4 together provide the same VC label-to-tunnel label mapping information as the label table in FIG. 3. However, by using the GID table, when a failure occurs that necessitate changing or rewriting the existing tunnel labels, the number of changes required is greatly reduced. For example, when a tunnel label mapped to the GID having the value of "1" needs to be changed, the corresponding entry is changed from an existing value of "20" to a new value of "40", and the corresponding interface is also changed from "1" to "3", as illustrated in the GID table. Note that the same change applies regardless of the number of VC labels mapped to the tunnel label being changed. FIG. 6A is a diagram illustrating a datagram with a VC label 600 and an existing tunnel label 605. FIG. 6B is a diagram illustrating the same datagram as in FIG. 6A with a new tunnel label 610 replacing the existing tunnel label 605.

The technique of replacing an existing tunnel label with a new tunnel label using a GID table can be used to switch from a failed LSP to a backup LSP in the path protection process described above. That is, when a LSP fails, the tunnel labels associated with the failing LSP are replaced with new tunnel labels associated with the backup path. The GID table allows the rewriting of the tunnel labels to be performed quickly and efficiently.

Figure 7:
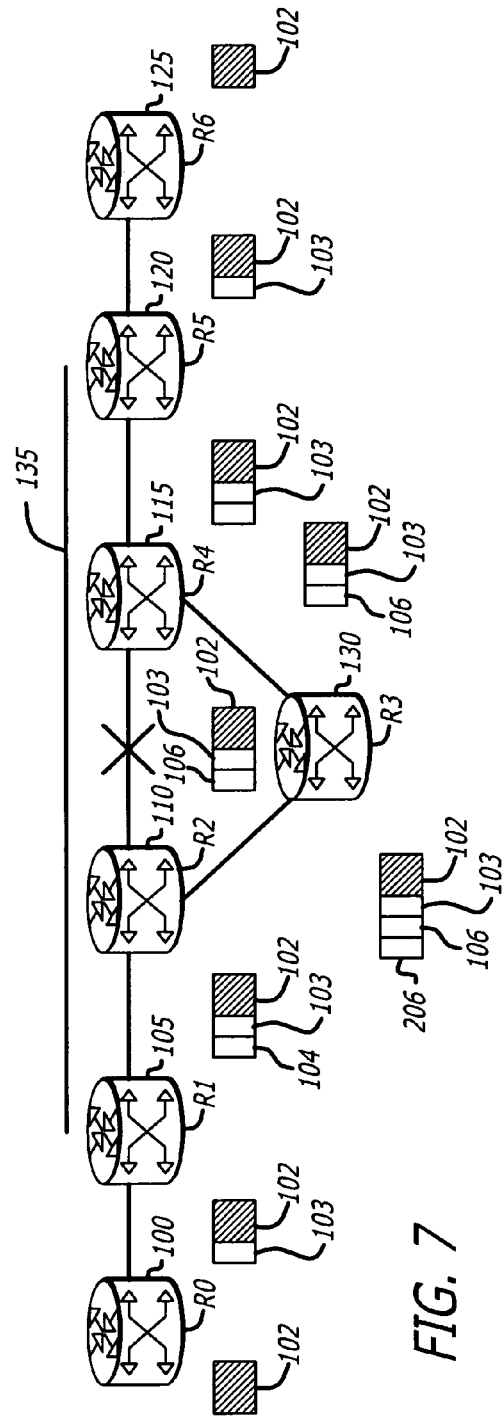
FIG. 7 is a diagram illustrating an example of a link reroute in an MPLS network.

A link is controlled by the end routers associated with that link. When a link fails, link reroute to a backup link can be performed. FIG. 7 is a diagram illustrating an example of a link reroute in an MPLS network. When the LSR 110 recognizes that the link between it and the LSR 115 fails, the LSR 110 may reroute the datagrams intended to be forwarded to the LSR 115 to the LSR 130. This is done using a backup link between the LSR 110 and the LSR 130. Note that this requires pushing a backup label 206 onto the label stack above the tunnel label 106. Except for the backup label 206, the format of the datagram to be transmitted between the LSR 110 and the LSR 115 remains the same when that datagram is forwarded from the LSR 110 to the LSR 130. Thus, the LSR 110 swaps the tunnel label 104 with the tunnel label 106 (as before) but also pushes the backup label 206 on the top of the label stack. The LSR 130 recognizes that the backup label is on top of the label stack, removes it from the label stack, and forwards the datagram to the LSR 115. The LSR 115 receives the identical datagram from the LSR 130 as it would receive from the LSR 110. The process of rerouting from one link to a backup link is referred to as a link protection process. Typically, link protection is configured on a per link basis and the backup link may be preconfigured.

FIG. 8 illustrates another embodiment of the GID table. In addition to the GID column 520, the tunnel label column 525, and the interface column 530, this GID table also includes a backup label enable column 835, a backup label 840, and a new interface column 845. When an entry in the backup label enable column 835 is listed as "NO", the corresponding entries listed in the backup label column 840 and the new interface column 845 are ignored. In this example, because all of the entries under the backup label enable column 835 are listed as "NO", the GID table in FIG. 8 is similar to the GID table in FIG. 5.

For one embodiment, when an entry under the backup label enable column 835 is listed as "YES", the GID table in FIG. 8 can be used to add a backup label in a link protection process. FIG. 9 illustrates enabling of backup labels using the GID table. The first entry in the backup label enable column 835 is listed as "YES". This indicates that a backup tunnel label having a value of "50" is pushed onto the label stack, as shown under the backup label column 840. Note that the corresponding tunnel label shown under the tunnel label column 525 and the corresponding interface shown under the original interface column 530 remain unchanged at "20" and "1", respectively. The rerouted datagram is forwarded to a new LSR using the interface shown under the new interface column 845.

FIG. 10A illustrates a datagram with a VC label 1000 and a tunnel label 1005. FIG. 10B illustrates the same datagram being rerouted with the same VC label 1000, tunnel label 1005, and a backup label 1010.

Figure 11:
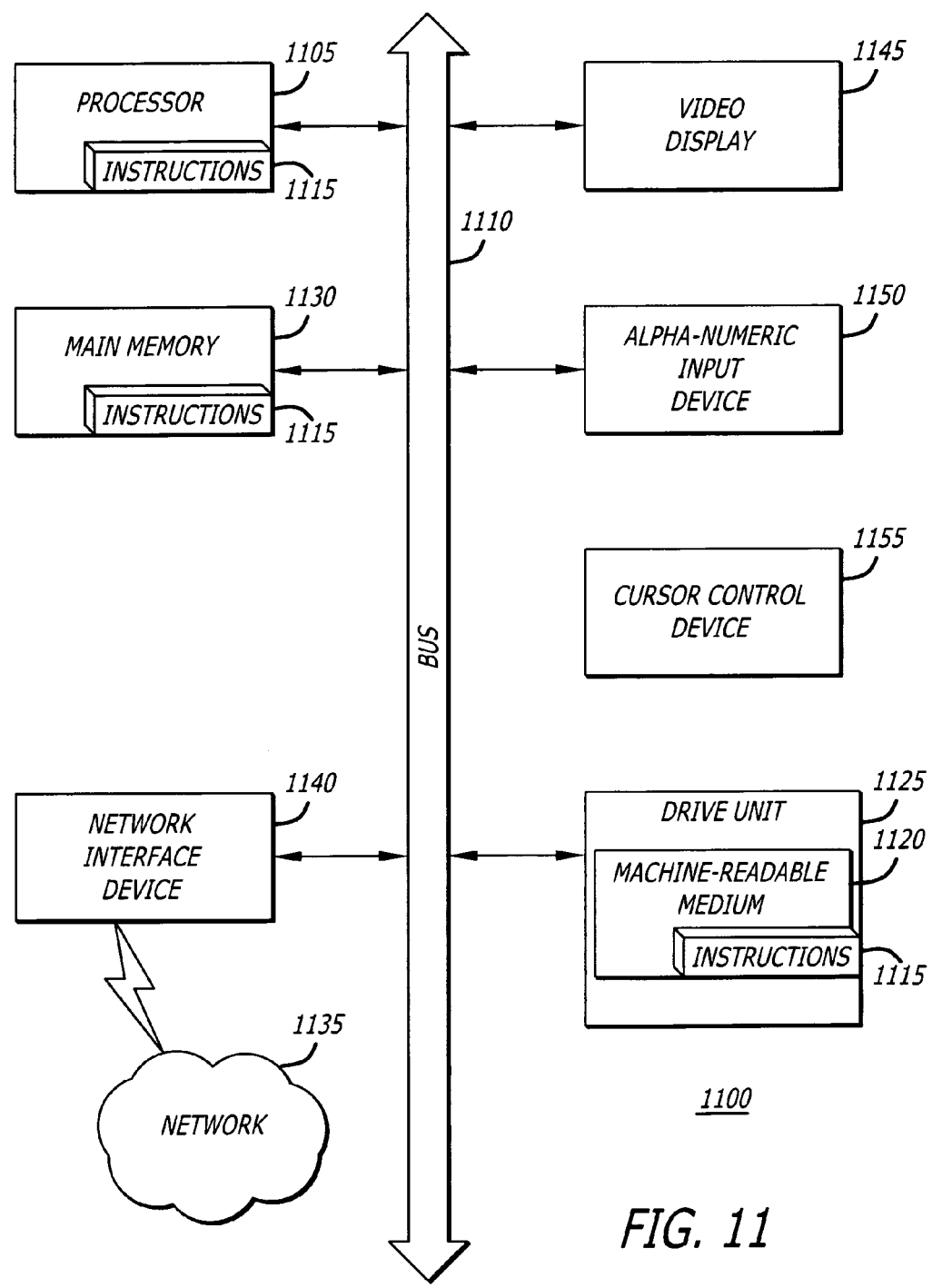
FIG. 11 illustrates a computer system that can be used with one embodiment of the present invention.

FIG. 11 illustrates a computer system that can be used with one embodiment of the present invention. The operations of the various methods of the present invention may be implemented by a processing unit 1105 in a digital processing system 1100. The processing unit 1105 is coupled with a bus 1110 and executes sequences of computer program instructions 1115. For example, the computer program instructions 1115 may include instructions to perform the mapping of tunnel labels to GIDs in a GID table and the rewriting of the tunnel labels in the GID table. The instructions 1115 may be stored in a memory which may be considered to be a machine-readable storage media 1120. The machine-readable storage media 1120 may be used with a drive unit 1125 coupled with the bus 1110. The instructions 1115 may be loaded into main memory 1130 coupled with the bus 1110. Although not shown, other memory devices such as, for example, read-only memory, a persistent storage memory, or any combination of these devices may also be used to store the instructions 1115.

Execution of the sequences of instruction 1115 causes the processing unit 1105 to perform operations according to the present invention. The instructions 1115 may be loaded into the main memory 1130 from a storage device or from one or more other digital processing systems (e.g. a server computer system) over a network 1135 using network interface device 1140. In other cases, the instructions 1115 may not be performed directly or they may not be directly executable by the processing unit 1105. Under these circumstances, the executions may be executed by causing the processing unit 1105 to execute an interpreter that interprets the instructions 1115, or by causing the processing unit 1105 to execute instructions, which convert the received instructions 1115 to instructions which can be directly executed by the processor. Other devices may also be connected to the bus 1100 including, for example, a video display 1145, an alphanumeric input device 1150, and a cursor control device 1155.

In other embodiments, hard-wired circuitry may be used in place of or in combination with software instructions to implement the present invention. Thus, the present invention is not limited to any specific combination of hardware circuitry and software, nor to any particular source for the instructions executed by the digital processing system 1100.

A method and a system for fast label switching for layer 2 transport over MPLS networks have been disclosed. The method minimizes the switchover time for path protection and link protection. The method also allows for memory conservation because the number of tunnel labels stored in the label information base (LIB) is significantly less than the number of VC labels. Although the above description refers to path failure and link failure, the method and system disclosed may also be applied when there is a node failure.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of switching a Label Switch Path (LSP) in a multiprotocol label switching (MPLS) network by a Label Switch Router (LSR), the method comprising:

mapping one or more virtual circuit (VC) labels associated with a first tunnel label to a first group identification (GID);

mapping the first GID with the first tunnel label;

remapping the first GID with a second tunnel label when a failure occurs that necessitates changing the first tunnel label;

forwarding a datagram having a VC label associated with the first tunnel label using the second tunnel label instead of the first tunnel label; and mapping one or more VC labels associated with a third tunnel label to a second GID, the second GID being different from the first GID.

2. The method of claim 1, wherein the datagram includes the VC label that is associated with the first tunnel label before the first GID is mapped with the second tunnel label.

3. The method of claim 1, wherein mapping the first GID with the second tunnel label comprises rewriting the first tunnel label with the second tunnel label in the mapping of the first GID with the first tunnel label.

4. A method of maintaining tunnel labels by a Label Switch Router (LSR), the method comprising:

forming a label table that maps virtual circuit (VC) labels to group identifications (GIDs), each of the VC labels that was previously mapped to a same tunnel label being mapped to a same group identification;

forming a GID table that maps each of the different GIDs to a different tunnel label that identifies an adjacent LSR;

forwarding a datagram using a VC label associated with the datagram to determine a GID for the datagram from the VC labels in the label table and using the determined GID to determine a tunnel label for the datagram from the tunnel labels in the GID table; and associating the VC labels in a group of VC labels having the same GID with a new common tunnel label by rewriting one entry in the GID table with the new common tunnel label to update the GID table and reflect the new common-tunnel label when a failure occurs that necessitates changing the first tunnel label.

5. The method of claim 4, further comprising forwarding the datagrams using the new common tunnel label by using the VC labels in the label table and the new common tunnel label in the GID table.

6. The method of claim 4, wherein the GID table further maps each of the different GIDs to a different backup tunnel label such that when a backup tunnel label indicator is set, the datagrams are forwarded using the backup tunnel label.

7. The method of claim 6, wherein the backup tunnel label is used without having to rewrite the tunnel labels in the GID table.

8. The method of claim 7, wherein the backup tunnel label is used when there is a link error.

9. A computer readable medium having stored thereon sequences of instructions which are executable by a system, and which, when executed by the system, cause the system to:

form a label table that maps virtual circuit (VC) labels to group identifications (GIDs), each of the VC labels that was previously mapped to a same tunnel label being mapped to a same group identification;

form a GID table that maps each of the different GIDs to a different tunnel label that identifies an adjacent LSR;

forward a datagram using a VC label associated with the datagram to determine a GID for the datagram from the VC labels in the label table and using the determined GID to determine a tunnel label for the datagram from the tunnel labels in the GID table; and associate the VC labels in a group of VC labels having the same GID with a new common tunnel label by rewriting one entry in the GID table with the new common tunnel label to update the GID table and reflect the new common-tunnel label when a failure occurs that necessitates changing the first tunnel label.

10. The computer readable medium of claim 9, further comprising instructions to forward the datagrams using the new common tunnel label by using the label table and the GID table.

11. The computer readable medium of claim 10, wherein the instructions to forward datagrams using the label table and the GID table comprises instructions to use the GIDs in the label table to get the tunnel labels in the GID table.

12. The computer readable medium of claim 9, wherein the instructions to form the GID table further comprises instructions to map each of the different GIDs to a different backup tunnel label such that when a backup tunnel label indicator is set, the datagrams are forwarded using the backup tunnel label.

13. The computer readable medium of claim 12, wherein the backup tunnel label is used without having to rewrite the tunnel labels in the GID table.

14. The computer readable medium of claim 13, wherein the backup tunnel label is used when there is a link error.

15. An apparatus, comprising:

a bus;

a memory coupled to the bus;

a processor coupled to the memory and the bus, the processor configured to form a label table that maps virtual circuit (VC) labels to group identifications (GIDs), each of the VC labels that was previously mapped to a same tunnel label being mapped to a same group identification, form a GID table that maps each of the different GIDs to a different tunnel label that identifies an adjacent LSR, forward a datagram in a multiprotocol label switching (MPLS) network using a VC label associated with the datagram to determine a GID for the datagram from the label table and using the determined GID to determine a tunnel label for the datagram from the tunnel labels in the GID table, and associate the VC labels in a group of VC labels having the same GID with a new common tunnel label by rewriting one entry in the GID table with the new common tunnel label to update the GID table and reflect the new common-tunnel label when a failure occurs that necessitates changing the first tunnel label.

16. The apparatus of claim 15, wherein when the datagrams cannot be forwarded to an egress router with a current label switch path (LSP) using a current tunnel label in the GID table, a new tunnel label is used by rewriting the current tunnel label with the new tunnel label in the GID table.

17. The apparatus of claim 15, wherein when the datagrams cannot be forwarded to a next router using a current tunnel label in the GID table, a backup tunnel label in the GID table is used by setting a backup tunnel label indicator, the backup tunnel label corresponding to the GID associated with the current tunnel label.

18. The apparatus of claim 17, wherein the backup tunnel label is associated with a backup router, and wherein the backup router uses the current tunnel label in the GID table to forward the datagram from the backup router to the next router.

19. An apparatus, comprising:

means for forming a label table that maps virtual circuit (VC) labels to group identifications (GIDs), each of the VC labels that was previously mapped to a same tunnel label being mapped to a same group identification;

means for forming a GID table that maps each of the different GIDs to a different tunnel label that identifies an adjacent LSR;

means for forwarding a datagram in a multiprotocol label switching (MPLS) network using a VC label associated with the datagram to determine a GID for the datagram from the label table and using the determined GID to determine a tunnel label for the datagram from the tunnel labels in the GID table; and means for using a backup tunnel label in the GID table to forward the datagrams to a next router instead of a current tunnel label when the datagrams cannot be forwarded to the next router using the current tunnel label, the backup tunnel label on the label stack above the current tunnel label and corresponding to the GID associated with the current tunnel label when a failure occurs that necessitates changing the first tunnel label.

20. The apparatus of claim 19, further comprising means for using a new tunnel label to forward the datagrams to an egress router with a current label switch path (LSP) instead of a current tunnel label when the datagrams cannot be forwarded using the current tunnel label.

21. The apparatus of claim 19, further comprising means for enabling the backup tunnel label such that the backup tunnel label in the GID table is used to forward the datagrams to the next router.

22. The apparatus of claim 19, further comprising means for the using the current tunnel label in the GID table to forward the datagrams from the backup router to the next router.

23. A Label Switch Router (LSR), comprising:
a bus;
a memory coupled to the bus;
a processor coupled to the memory and the bus, the processor to map one or more VC labels associated with a first tunnel label to a first group identification (GID),
map the first GID with the first tunnel label,
remap the first GID with a second tunnel label when a failure occurs that necessitates changing the first tunnel label,
forward a datagram having a VC label associated with the first tunnel label using the second tunnel label instead of the first tunnel label, and
map one or more VC labels associated with a third tunnel label to a second GID, the second GID being different from the first GID.

24. The apparatus of claim 23, wherein the datagram includes the VC label that is associated with the first tunnel label.

25. The apparatus of claim 23, wherein the processor maps the first GID with the second tunnel label by rewriting the first tunnel label with the second tunnel label.

26. A computer readable medium having stored thereon sequences of instructions which are executable by a system, and which, when executed by the system, cause the system to:

map one or more virtual circuit (VC) labels associated with a first tunnel label to a first group identification (GID) in a Label Switch Router (LSR);

map the first GID with the first tunnel label;

remap the first GID with a second tunnel label when a failure occurs that necessitates changing the first tunnel label, forward a datagram having a VC label associated with the first tunnel label using the second tunnel label instead of the first tunnel label; and map one or more VC labels associated with a third tunnel label to a second GID, the second GID being different from the first GID.

27. The computer readable medium of claim 26, wherein the datagram includes the VC label that is associated with the first tunnel label before the first GID is mapped with the second tunnel label.

28. The computer readable medium of claim 26, wherein the instructions to map the first GID with the second tunnel label comprises instructions to rewrite the first tunnel label with the second tunnel label in the mapping of the first GID with the first tunnel label.

* * * * *